Nov. 6, 1934.  F. O. GIESECKE  1,979,257
STARCH PRODUCT AND METHOD OF MAKING SAME
Filed Dec. 26, 1928  2 Sheets-Sheet 1
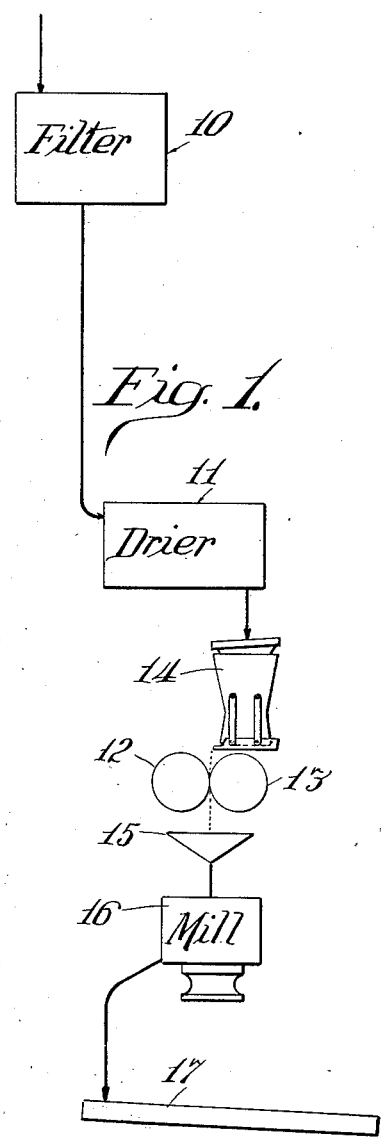
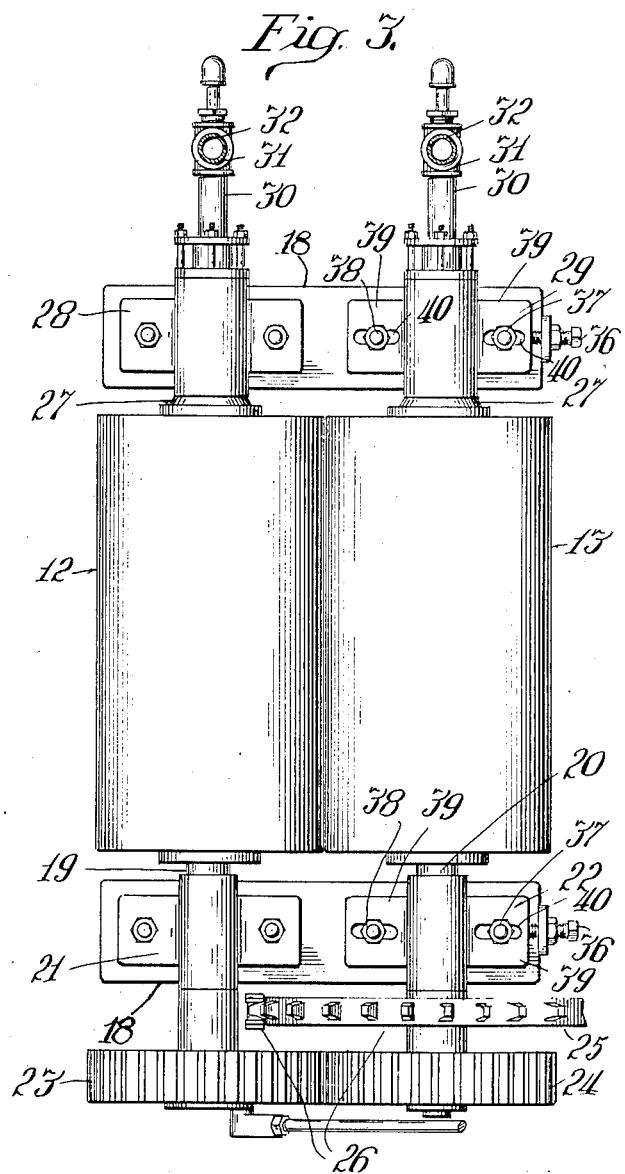

Nov. 6, 1934.  F. O. GIESECKE  1,979,257
STARCH PRODUCT AND METHOD OF MAKING SAME
Filed Dec. 26, 1928  2 Sheets-Sheet 2
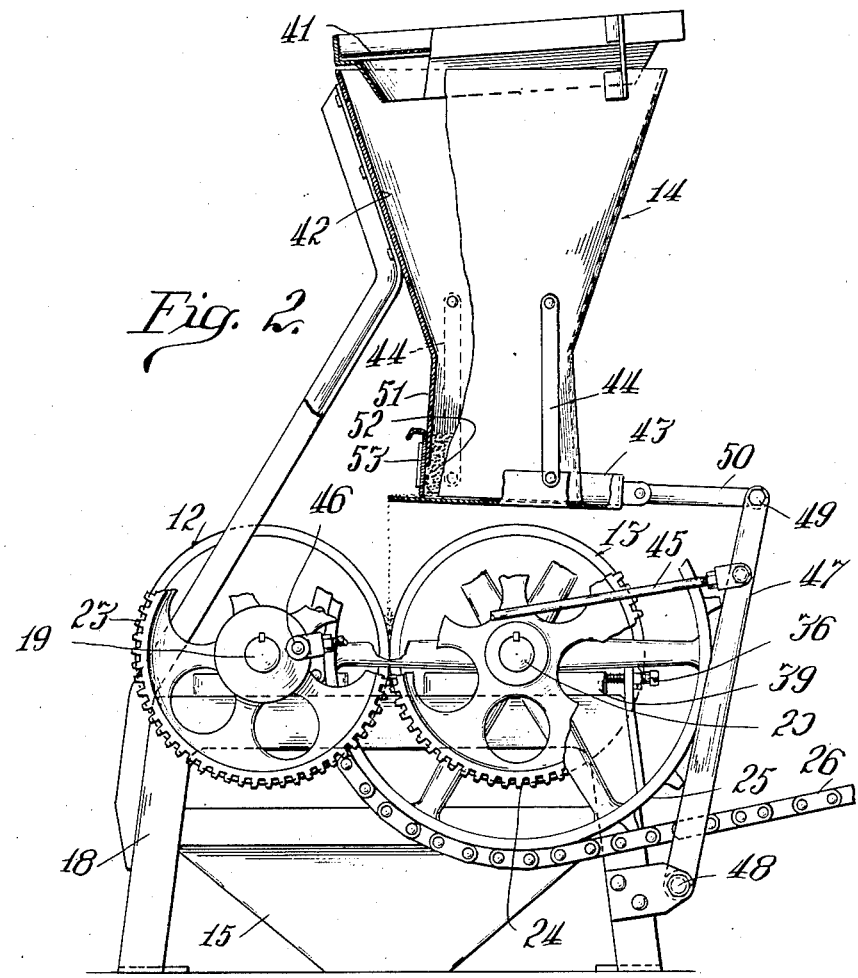
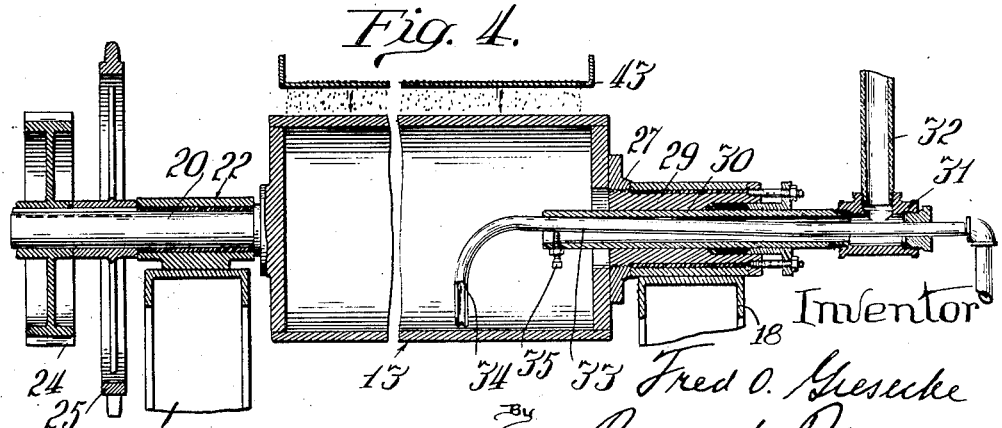
Inventor
Fred O. Giesecke
By Barnett Truman
Attorneys.

Patented Nov. 6, 1934

1,979,257

UNITED STATES PATENT OFFICE 1,979,257

STARCH PRODUCT AND METHOD OF MAKING SAME

Fred O. Giesecke, Evanston, Ill., assignor to International Patents Development Company, Wilmington, Del., a corporation of Delaware Application December 26, 1928, Serial No. 328,577

8 Claims. (Cl. 127—71)

This invention relates to the manufacture from corn starch of a series of products having somewhat different compositions and characteristics, useful for adhesive pastes, binders, fillers, sizes and for other purposes, which products may be characterized in that they consist principally of starch treated so that it will take on a colloidal character, when mixed with water without heating. These products may contain relatively small quantities of substances, (and are thereby differentiated from each other) such for example as gluten—the protein of the grain from which the starch is derived—cellulosic material and dextrine. A product of this series will absorb water in relatively large amounts although this capacity can be varied considerably. The percentage of soluble substances in the products will ordinarily be low, although this factor may also be varied if desired. The pastes formed will stand for a long time without liquefying and without fermenting.

One of the objects of the invention is to provide a simple and inexpensive method of manufacturing products of this sort from corn (maize); specifically to provide a method based on the "wet milling" principle in which the starch, or mixture of starch and other substances, to be subjected to the gelatinizing treatment is produced from the corn by a series of operations corresponding to the operations to which the corn is subjected in the manufacture of starch by the wet method. That is to say in accordance with the present invention the starch material to be given the gelatinizing treatment for the production of one or other of the products in contemplation may be produced by ordinary wet starch methods of making starch from corn and this makes possible a very low cost of production and gives the products certain new and desirable characteristics which differentiates them from the somewhat similar products made from hominy or corn grits.

Certain of this series of products can be made from starch mixtures derived at intermediate stages of the process of manufacturing the starch from corn; and in such cases the use of these mixtures (which may be regarded as residual products from which, in the normal starch making process, the starch can be derived only with some difficulty) has the advantage of simplifying the manufacture of the starch in its ultimate commercially pure form by the withdrawal of these residual mixtures from the process, as well as the further advantage of the utilization of a cheap raw material for the production of the gelatinized starch products with which this invention is primarily concerned.

Another advantage of this method of procedure is that it makes possible a variation of the properties and characteristics of the product in accordance with special requirements, either by the withdrawal of the material for gelatinization at one rather than at another stage of the starch making process; or by the addition of ingredients to the starch, or mixture of starch and other substances, as may be necessary in order to modify to the desired extent the characteristics of the finished product.

In respect both to cheapness of manufacture and capacity for varying the characteristics of the product to meet particular needs the process of this invention has advantages over the process of making gelatinized starch products from hominy grits produced by the customary dry milling methods.

In the accompanying drawings:

Fig. 1 is a flow sheet illustrating the process;

Fig. 2 is a side elevation, with parts in section of the apparatus for gelatinizing the starch;

Fig. 3 is a plan view of this apparatus with the feeding device removed;

Fig. 4 is a longitudinal sectional view through one of the rolls and associated parts.

Referring first to Fig. 1, 10 designates a dewatering device, a vacuum filter for example, for reducing the water content of the starch or starch mixture, 11 a drier for further elimination of moisture, 12 and 13 a pair of heated rolls to which starch is fed by a feeding device 14, 15 a hopper for receiving the material from the rolls, 16 a mill in which the product which comes from the rolls in sheets or flakes is ground, and 17 a screen preferably of about 100 meshes to the linear inch, for eliminating lumps from the final product.

Referring now to Figs. 2, 3 and 4, the rolls 12, 13 are hollow and revolubly supported on a framework 18 above a hopper 15. The rolls are provided at one end with shafts 19, 20 turning in bearing boxes 21, 22, these shafts being geared together by gear wheels 23, 24 and one of them being provided with a sprocket 25 for a driving chain 26. The other ends of the rolls are furnished with hollow gudgeons 27, 27 supported in bearings 28, 29 on the framework 18. Through each of these gudgeons and into the rolls extends a pipe 30 carrying a fitting 31 in its outer end for a steam supply pipe 32. A stationary outlet pipe 33 for condensate extends through the fitting 31 and pipe 30 and has its inlet end 34 curved downwardly into proximity with the inner surface of the roll. The adjustment of the end of the condensate pipe with respect to the inner surface of the roll is effected by means of a set screw 35 extending through the inner end of pipe 30. The bearings 22 and 29 for the roll 13 are adjustable by means of set screws 36, 37, and 38, the flanges 39 of the bearing boxes being slotted at 40. This adjustment allows the distance between the rolls to be varied.

The starch, or starch mixture for treatment by the rolls is preferably introduced through a screen 41 into a hopper 42 supported above the rolls 12, 13 and provided with a swinging bottom or feeding member 43, the latter being supported from the sides of the hopper by pivoted links 44, 44. The feeding member is oscillated by means of a pitman 45 connected at one end to pin 46 on one of the gear wheels 23 and at the other end to a vertical link 47 pivoted at 48 to the framework 18 and at 49 to a link 50 which is pivotally connected with the feeding member 43. The forward side 51 of the hopper is formed with a slot 52, the effective height of which is varied by a slide 53. When the feeding member 43 moves from right to left, it carries with it from the hopper a layer of starch on its forward left-hand end (referring to Fig. 2). On the return movement of the feeding device, the layer of starch on the end of the feeding member outside of the hopper, is forced from the feeding member by its bearing against the body of starch in the hopper and falls between the rolls 12 and 13, and after passing between the rolls, into hopper 15 and then to the mill 16.

The following are examples of the products contemplated and the preferred methods of making the same:

*Example 1.*—The material used may be commercially pure dry starch to which water is added to increase its moisture content to between 25% and 50%, preferably between 38% and 45%, by weight; or starch from the starch tables may be used with such moisture content, either with or without washing in filters to remove soluble substances. Preferably unwashed table starch is used which as flushed from the tables will have a density of 16° Baumé. This magma is dewatered in filter 10 to a moisture content of about 46% (by weight) and then dried in drier 11 so as to contain approximately from 38% to 42% of water. If the water content is much lower than this, the adhesive properties of the product will be very considerably lessened. The following is a specific example of the composition of the material fed to the rolls:

| Wet basis: | Per cent |
|---|---|
| Solid substances | 58.86 |
| Water | 41.14 |
| Dry basis: | |
| Starch | 98.02 |
| Protein | 0.42 |
| All soluble substances | 0.27 |
| Ash | 0.17 |
| Oil | 0.30 |
| Not accounted for | 0.80 |
| | 100.00 |

Acidity .077 (titration with phenolphthalein indicator calculated as HCl) pH=4.9.

Some of the protein may be soluble and this is included in the item of soluble substances.

This material consisting essentially, it will be seen, of starch having a fairly high degree of purity for commercial starch, is spread out in a thin layer and fed between the steam heated rolls 12, 13.

The rolls which may be 30 inches in diameter are preferably set approximately 0.005 of an inch apart, are revolved at about 2 revolutions per minute and are heated to a temperature sufficient to produce the desired degree of gelatinization of the starch.

In the specific example given the steam pressure was 90 pounds per square inch, the equivalent temperature being about 331° F. The temperature of the exterior of the rolls, however, will necessarily be somewhat lower than this due to radiation and the cooling effect of the starch. It will probably be in the neighborhood of 300° F. A certain amount of the starch is preferably allowed to accumulate in the bight between the rolls as indicated in the drawings.

The following gives the result of analysis of the product made as above described:

| | Per cent |
|---|---|
| Solid substances | 92.66 |
| Moisture | 7.34 |
| Dry basis: | |
| Starch | 91.20 |
| Protein | 0.46 |
| Soluble substances | 7.66 |
| Dextrine | 7.31 |
| Ash | 0.17 |
| Dextrose (trace) | |
| Oil | 0.30 |

Acidity .070
pH=5.2.

Water absorption 10 (10 parts by weight of water to 1 part of product).

This analysis is typical of a product made by a run of starch of the composition above indicated. Due allowance must be made however for discrepancies due to the impracticability of taking exactly correspondent samples of raw material and finished product.

This statement applies also to later comparative tables.

The starch in passing through the rolls has been gelatinized and a small part of it hydrolyzed to form conversion products which are principally dextrines as determined by precipitation with alcohol. The extent to which the starch is modified may be varied slightly by varying the water content of the starch, the temperature of the rolls, the pressure exerted by the rolls, and the length of time of the heat and pressure treatment.

The capacity of the machine may be increased without material change in the product by decreasing the time factor and increasing the heat. The proportion of conversion to gelatinization may be increased by increase of acidity, by lowering moisture content or by increasing temperature. The protein content may be increased by having more gluten in the raw material, and for some purposes this is an advantage, as will be described. For the particular product just described the gluten content should not be in excess of 0.5%.

The high temperature and pressure to which the material is subjected by the rolls followed by the sudden relief of pressure apparently brings about an explosive bursting of the starch cells which ruptures the cell integuments and increases the volume of the inclosed starch matter so that the starch under the microscope appears to be structureless and in a highly dispersed state. The extent of this dispersion depends upon temperature, pressure, duration of treatment and particularly upon the water content of the material which, to obtain uniform results and the maximum gelatinizing effect (dispersion of the starch matter), is preferably between the limits indicated above.

Variation of the composition of the product will be according to the particular characteristics desired in view of the intended use of the product. For a wall paper paste the water absorption should not be as high as is actually obtainable. It may be about 8. This diminished water absorption can be accomplished by increasing temperature to give a dextrine content of approximately 9%. The small protein content makes possible a white color very desirable in a wall paper paste. With the dry milling method selected white corn has to be used for making a white product which increases cost of production. Oil necessarily reduces adhesiveness and in this product is present only in minute quantities.

For a filler or binder, for briquetting, for example, the water absorption should be high, and in fact may be made as high as 1 to 12 by limiting the dextrine content to 6% to 8%.

The type of product described under this caption (Example 1) may be varied in composition within the following limits (dry substance basis):

Starch _____ 87% to 92%
Protein _____ 0.1% to 0.5%
Dextrine _____ 7% to 12%
Water absorption from 1–6 to 1–12

The moisture may vary from 7% to 12%. This is not an important factor, except as trade custom and requirements may standardize moisture. A desirable moisture content is 10%.

The material as it is stripped from the rolls is in the form of flaky, friable sheets quite dense due to the pressure exerted by the rolls. These sheets or flakes are ordinarily ground up to give the material a pulverulent form facilitating its mixture with water.

*Example 2.*—For this product "mill starch" so-called is used in place of table starch. "Mill starch" is the mixture of starch and gluten, which, in the manufacture of starch by the wet milling method, is flowed over the starch tables for separation of the gluten from the starch. The methods of handling this material for gelatinization of the starch may be the same as described in connection with Example 1. The moisture content of the mill starch is reduced by the filter 10 and drier 11 from that represented by a Baumé of 4°–6° to approximately 38% to 42% and the material then passed through the heated rolls 12, 13 as described.

The following represents a typical example of the composition of the mixture sent to the rolls:

```
                                    Per cent
Solid substances _____ 60.66
Moisture _____ 39.34
Dry basis:
    Starch _____ 90.81
    Protein _____ 6.64
    Soluble substances _____ 1.12
    Ash _____ 0.29
    Oil _____  .78
Acidity 0.2
pH=4.2
```

The product will have substantially the following composition:

```
                                    Per cent
Solid substances _____ 92.90
Moisture _____ 7.10
Dry basis:
    Starch _____ 82.20
    Protein _____ 6.21
    Soluble substances _____ 9.68
    Dextrine _____ 8.48
    Ash _____ 0.25
    Dextrose (Trace)
    Oil _____  .71
Acidity 0.2
pH=4.8
Water absorption 6 to 8.
```

Different products of this general type (Example 2) may be made, by manipulations of the process such as were described in connection with the procedure under Example 1.

These products are good as binders, for example core binders, being preferred ordinarily for this purpose to those described under Example 1. Cores made with the products of Example 2 may have a green bond strength of from 3½ to 4 pounds and a dry bond strength of 10 pounds, measured by the usual tests. A product of this type is very effective in coming to the surface in baking the core to thereby form a hard, dense superficial skin.

*Example 3.*—Instead of using "mill starch" it is possible to employ as raw material the mixture known as "No. 17 tailings", being the tailings (in the wet milling starch making process) from the fine slop silk reels employed for making the separation, as between starch and gluten, on the one hand, and small bran and fibre particles on the other, which immediately precedes the tabling of the starch and gluten magma. In the current method of making starch from corn, the grain after steeping, coarse disintegration and removal of the germ, is ground in Buhr mills and then subjected to a "coarse slop" separating operation on copper reels to remove from the magma the coarser particles of bran and fibre. The liquid from this "coarse slop" separation is then run through a silk draining reel, from which the starch liquor goes to the tables and the tailings to a series of silk reels (fine slop reels) for the elimination from the starch and gluten of the finer bran and fibre particles. The tailings from either the draining reels (or one or other of the fine slop reels) may be used for the production of one of the series of products contemplated by this invention. The magma will contain some bran and fibre and will also contain the following substances—to give a specific example of mixture from draining reels:

```
                                    Per cent
Solid substances _____ 44.64
Moisture _____ 55.36
Dry basis:
    Starch _____ 87.16
    Protein _____ 8.62
    Soluble substances _____ 1.49
    Ash _____  .68
    Oil _____  .83
    Fibre _____ 1.30
Acidity .24
pH=4.4
```

This material, partially dewatered and treated between the rolls as in Examples 1 and 2 will give a product having substantially the following composition:

```
                                    Per cent
Solid substances _____ 95.42
Moisture _____ 4.58
Dry basis:
    Starch _____ 80.73
    Protein _____ 8.83
    Soluble substances _____ 7.95
    Dextrine _____ 6.05
    Ash _____ 0.63
    Dextrose (Trace)
    Oil _____  .79
    Fibre _____ 1.25
Acidity 0.2
pH=4.8
Water absorption—10
```

The product may be varied in its composition indicated in connection with Examples 1 and 2. The product is much the same in its general characteristics as that of Example 2 except that it contains a small percentage of cellulosic matter which gives an improved bond when the product is used as a binder in briquetting. Water absorption may vary from 1 to 5 to 1 to 12. The rate of absorption is somewhat slower than with the products of Examples 1 and 2.

A similar product may be made from a tailings mixture from one of the fine slop reels having a composition as follows:

|  | Per cent |
|---|---|
| Solid substances | 41.82 |
| Moisture | 58.18 |
| Dry basis: |  |
| Starch | 86.44 |
| Protein | 8.18 |
| Soluble substances | 1.55 |
| Ash | .75 |
| Oil | .90 |
| Fibre | 1.62 |

Acidity .21%
pH=4.3%

This material treated as above described will give a substance characterized as follows:

|  | Per cent |
|---|---|
| Solid substances | 92.17 |
| Moisture | 7.83 |
| Dry basis: |  |
| Starch | 78.84 |
| Protein | 7.95 |
| Soluble substances | 8.74 |
| Dextrine | 7.10 |
| Ash | .82 |
| Dextrose (Trace) |  |
| Oil | .82 |
| Fibre | 1.75 |

Acidity .197%
pH=4.9%
Water absorption—10

*Example 4.*—One may also employ a starch and gluten mixture, commonly called "table squeegee" to which however should be added, in order to make a product comparable with the product of Example 2, a certain amount of gluten. The tabled starch, after settling, is covered, particularly at the lower ends of the tables, with a film or layer of starch mixed with gluten. The practice is to remove this layer with a rubber squeegee. In order that the material should not be wasted it has been customary to return it to the process for re-separation; but this involves some difficulties and inconveniences, as the material does not separate readily. Consequently the use of this material for a gelatinized starch product simplifies and improves the process of starch making. Gluten may be added to the "table squeegee" so that, going to the rolls, the mixture will have a composition similar to that employed in making the product of Example 2 and this material treated as above described will give a product substantially like that of Example 2. One of the principal advantages in using "No. 17 tailings" or "table squeegee" is that these procedures further simplify and cheapen the starch making process by removing therefrom mixtures which are rather difficult to satisfactorily separate. In fact in making all of the products of the present invention the advantage is obtained, in comparison with the dry milling method or with any method involving the use of commercial dry starch, of using intermediate products in the wet starch process as raw material.

The products of the types above described may be modified, to vary their characteristics in certain respects, for certain special uses, by adding to such products after they are made or during their making, other substances for example dextrine or starch.

*Example 5.*—A desirable adhesive substance, for use as a binder for sand cores or other purposes, particularly for baked sand cores, can be produced by increasing the dextrine content of one of the products above described by the addition to the product of dextrine. One advantage of increasing the dextrine content in this manner, that is by the addition of dextrine to the gelatinized product instead of by converting more starch to dextrine, is that the desired kind and amount of dextrine in the final product can be more conveniently and accurately obtained than by an attempt to increase conversion in the rolls which is possible only to a limited extent. Also the desired dextrine content can be obtained without disturbing the relations, qualitative and quantitative, of the other substances in the product. Dextrines vary very considerably in their physical characteristics. The character of the dextrine produced by conversion in the rolls is determined by the particular treatment given to the starch as a whole. By blending the product from the rolls with dextrine the kind of dextrine can be selected to meet the requirements of the desired product. Moreover, any excessive dextrinization may produce a partial hydrolysis of the starch without actually converting such starch to dextrine, which would result in reducing water absorption capacity without giving the advantages ascribable to an increased dextrine content. The amount of dextrine to be added, (having in view the use of the blended product as a core binder) will depend upon whether one desires particular strength in the green bond or in the dry bond. That is, the dextrine content of the binder should be greater if the purpose is to strengthen the core after it has been baked than if the purpose is to add strength to the core, or other molding element, before it is baked or if the core or other molding element is to be used in its green condition. It is possible to strike what appears to be an advantageous balance between the strengths of the two bonds by increasing the dextrine content of the product to about 16% to 18%. Thus if to 90% by weight of the product of Example 2 is added 10% of a 99% soluble dextrine, a product will be obtained containing 17% of soluble substances mostly dextrine. The proportion of soluble substances may be varied, with the results indicated, over a range from 9% to 25%. Products suitable for this purpose may also be obtained by similarly increasing the dextrose contents of the products of Examples 1, 3 and 4, by the addition to said products of dextrine in suitable quantities; although a blend of the product of Example 1 with dextrine is not regarded as good a substance for use as core binder, as the blends with the products of Examples 2, 3 or 4.

Apparently when sand is mixed with a binder thus constituted and molded to form a core and the core baked, the baking will draw the soluble substances to the surfaces of the core, the water being evaporated and the solids forming a relatively hard and tenacious superficial skin. The colloidal character of the starch product is diminished as its solubility is increased so that for the green bond the soluble content should not be too high, since that depends upon the adhesive character of the binder.

In this and the other dextrine blended products to be described the dextrine may be either added to the product as it comes from the rolls or it may be introduced into the starch or starch mixture before it is passed through the rolls. The passage through the rolls, if the latter practice is followed, will have very little effect, if any, on the dextrine. The conditions are not favorable to the conversion of the dextrine to dextrose.

*Example 6.*—Other blends may be made by combining white dextrine of varying solubilities and in various amounts with the product of Example 1. For instance a blended product of equal parts of the Example 1 material and white dextrine having a solubility of 60% to 70% will serve for dusting noodles, candy crullers and like articles.

*Example 7.*—A core binder for special purposes can be made by blending with any of the products of Examples 2, 3 or 4 a certain amount of raw starch, for example 10% by weight—which in this case is preferably added to the product after passing through the rolls. In making baked cores the green sand cores after molding are sometimes dipped into graphite and water before going to the kiln. If the capacity of the binder for water absorption is too great the core may become soft and sag. By adding starch the capacity for water absorption is retarded and decreased but when the core is baked, at the usual temperature of from 325° to 450° F., the starch is gelatinized, to a considerable extent at least, so that the added raw starch ultimately performs an adhesive function. It cannot be regarded as a mere inert filling substance.

Other products specifically different from those described above, but having, generally speaking, analogous properties, can be made by following the suggestions as to modifications given above. Some variation also might be made in methods and apparatus used. It is the intention therefore to cover by patent all products, processes and apparatus coming within the scope of the appended claims.

Where the claims hereof mention the treatment of "starch" without qualification as a raw material this term is not to be understood as excluding the small gluten and cellulose contents contemplated by Examples 2, 3 or 4.

I do not claim herein the above described products as they are claimed in copending applications as follows: Serial No. 552,079 (Example 1 hereof); Serial No. 552,078 (Example 2); Serial No. 552,080 (Examples 3 and 4); and Serial No. 552,081 (Examples 5 and 6), all filed July 20, 1931.

I claim:

1. Method of making an adhesive product of the character described which comprises subjecting corn starch having a moisture content of from approximately 38% to 45% and containing substantially no hydrolyzing agent to momentarily applied mechanical pressure and to a temperature of approximately 300° F. while permitting free evaporation of moisture.

2. Method of making an adhesive product of the character described which comprises subjecting corn starch containing corn gluten and having a moisture content of from approximately 38% to 45% and containing substantially no hydrolyzing agent to momentarily applied mechanical pressure and to a temperature of approximately 300° F. while permitting free evaporation of moisture.

3. Method of making an adhesive product of the character described which comprises subjecting corn starch containing approximately 6% to 8% corn gluten and having a moisture content of from approximately 38% to 45% and containing substantially no hydrolyzing agent to momentarily applied mechanical pressure and to a temperature of approximately 300° F. while permitting free evaporation of moisture.

4. Method of manufacturing an adhesive product which comprises subjecting corn in a comminuted state and in water to separating operations to yield a water magma containing starch, removing sufficient water from said mixture to leave the starch material in a wet but non-fluent state and subjecting the material containing substantially no hydrolyzing agent to momentarily applied pressure and to a temperature substantially above the gelatinizing temperature of the starch while permitting free evaporation of moisture.

5. Method of making an adhesive product which comprises subjecting corn in a comminuted state and in water to separating operations to yield a water magma containing starch and approximately 6% to 8% of gluten, removing sufficient water from said mixture to leave the material in a wet but non-fluent state, and subjecting the material containing substantially no hydrolyzing agent to momentarily applied pressure and to a temperature substantially above the gelatinizing temperature of the starch while permitting free evaporation of moisture.

6. Method of making an adhesive product which comprises subjecting corn in a comminuted state and in water to separating operations to yield a water magma of corn substance containing not less than approximately 85% of starch, dewatering said mixture to reduce the same to a non-fluent but wet state and causing the mixture to be passed under atmospheric pressure and with substantially no hydrolyzing agent through rolls heated to impart to the material a temperature substantially above the gelatinizing temperature of the starch while permitting free evaporation of moisture.

7. Method of making an adhesive product of the character described which comprises subjecting corn starch having a moisture content between approximately 38% and 50% and containing substantially no hydrolyzing agent to momentarily applied pressure to a starch gelatinizing temperature while permitting free evaporation of moisture.

8. Method of making an adhesive product which comprises subjecting corn starch in a wet but non-fluent state and containing substantially no hydrolyzing agent to pressure, momentarily applied, and to a gelatinizing temperature while permitting the free evaporation of moisture.

FRED C. GIESECKE.